Patented Feb. 22, 1927.

1,618,866

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

REMOVING COMPOSITION CONTAINING ETHYL ACETATE.

No Drawing. Application filed December 21, 1923, Serial No. 682,067. Renewed January 14, 1927.

This invention relates to paint and varnish removing compositions having as the essential solvent ethyl acetate incorporated with other solvents and waxy material.

Ethyl acetate has the property of dissolving mineral wax, namely paraffin or ceresin wax, in sufficient quantity so that the solution when exposed on a coating of paint or varnish will yield an evaporation retarding film and permit the ethyl acetate to exert a solvent action on the finish coating. The amount of wax which ethyl acetate will dissolve is substantially greater than the traces which may go into solution in the case of what are commonly regarded wax non-solvents, namely methyl and ethyl alcohol, acetone, methyl acetone and the like. These wax non-solvents, commonly employed in paint and varnish removers, require the presence of benzol, toluol, or some other pronounced wax solvent to permit of the presence in the composition of wax in a form capable of yielding an evaporation retarding film. Such a requirement is not necessary with respect to ethyl acetate in that it does dissolve wax adequate to form a film. However the proportion of wax varies with the temperature being somewhat less soluble when the solution is cold. To retard the evaporation sufficiently for the successful use of a solvent requires a proportion of wax adequate to yield a substantially continuous film or blanket of wax over the surface of the solvent.

Viewing the composition from another standpoint ethyl acetate in common with solvents of a generally alcoholic type including methyl and ethyl alcohol, volatile ketones and the like has a pronounced solvent action on nitrocellulose and on shellac. Benzol on the other hand is a non-solvent for these bodies. A removing composition containing a large proportion of benzol therefore does not have as good a removing action in most cases on coatings of nitrocellulose or shellac. In the present invention it is an object to be able to slightly increase the proportion of wax in a remover containing ethyl acetate as the essential or major constituent. Thus the advantage of ethyl acetate from the standpoint of its softening action on nitrocellulose and shellac coatings is rendered available and in the form of a composition contains effective amounts of wax in cold weather which is capable of general use as a paint and varnish remover. This result is effected by the addition to ethyl acetate and wax of a small proportion of benzol, toluol or similar wax solvent. Benzol, toluol and the like, which are powerful wax solvents, also may be defined herein, as in a number of prior patents to me, as being "penetrating finish solvents" in that they readily penetrate into and through the dried coating to be removed, carrying the more active loosening solvent (in this case comprising essentially ethyl acetate) which latter is thereby assisted in exercising its solvent action upon the dried finish to be removed. Trichlorethylene may for example be introduced. This is a far more effective solvent for paint and varnish coatings than carbon tetrachloride. The amount of wax solvent (other than ethyl acetate) thus introduced ordinarily will be about 5 to 10 per cent but larger proportions may be used in some cases.

Thus a remover may be made by adding 3 to 4 per cent of molten paraffin wax to a mixture of 90 parts of ethyl acetate and 10 parts of benzol; the mixture being stirred while the wax is being introduced. Or the wax may be warmed with the composite solvent until in solution. Another composition may be made by incorporating for example 80 parts of ethyl acetate with 20 parts of trichlorethylene and 5 per cent of paraffin wax. When ceresin wax is used a smooth pasty composition may be prepared with a proportion of wax approximating 5 or 6 per cent. Such a pasty form of remover is useful for vertical and overhead surfaces.

Two or three per cent of nitrocellulose or pyroxylin or other cellulose ether such as cellulose acetate may be introduced to improve the body of the remover and serve as a protective colloid for the wax, enabling a better degree of gelatinization to be secured. This is especially the case with paraffin wax which has a more crystalline tendency than the amorphous ceresin wax. The pyroxylin may be added in the form of celluloid or well-cleaned waste moving picture film.

In addition to the hydrocarbon and chlorinated solvents mentioned other solvent material of a kindred character or functioning in a similar manner may be introduced, also small amounts of other solvents such as alcohol, methyl acetone, methyl acetate and the like.

The essential feature as stated is the use of ethyl acetate as the key solvent because of its joint solvent action on wax and on nitrocellulose and shellac and to include in the composition quantities of other solvents of a compatible nature in an amount ordinarily less than fifty per cent and preferably substantially less than fifty per cent of the entire amount of solvent material used in the removing composition. Also to have present a quantity of mineral wax or other material capable of retarding evaporation in a similar manner with or without a protective colloid such as nitrocellulose ester.

The ethyl acetate employed may be the ordinary commercial grade containing a small amount of water but preferably "anhydrous" ethyl acetate is used. By such anhydrous material I do not mean one that is absolutely free from any trace of moisture whatsoever but what is recognized in commerce as anhydrous ethyl acetate. Impure ethyl acetate containing small amounts of ethyl alcohol and acetic acid also may be used in some cases.

Best results are obtained by using compatible solvents which are miscible with one another and thus blend to a clear solvent mixture. In such a compatible mixture the wax is gelatinized to better advantage than when separation occurs. Hence the presence of water which tends to cause separation is undesirable because not only is the solvent effect weakened by the dilution due to water but the joint action of the solvents is not exerted effectively when such separation exists.

What I claim is:—

1. A finish remover consisting of wax incorporated in a solvent mixture, the major portion of which is ethyl acetate and the minor portion a hydrocarbon wax solvent, such remover being substantially free from water.

2. A finish remover comprising a solvent mixture composed of ethyl acetate approximately ninety per cent and benzol ten per cent incorporated with a few per cent of paraffin wax.

3. A finish remover comprising a solvent mixture composed of ethyl acetate approximately ninety per cent and benzol ten per cent incorporated with a few per cent of paraffin wax and nitrocellulose.

4. A finish remover adapted for the removal of coatings of nitrocellulose and shellac which consists of ethyl acetate and benzol both serving as wax solvents incorporated with wax and nitrocellulose; the proportion of wax being sufficient to yield an effective blanketing film capable of retarding evaporation in a substantial manner, such composition being substantially free from water.

5. A finish remover comprising wax incorporated in a solvent mixture the major constitutent of which is ethyl acetate and the minor constituent a powerful wax solvent which is a penetrating finish solvent; the proportion of wax being adequate to yield an effective blanketing film capable of retarding evaporation in a substantial manner, said composition being substantially free from water.

6. A finish remover consisting essentially of a wax dissolved in a substantially anhydrous solvent mixture, the major portion of said solvent mixture consisting of ethyl acetate, and a large part, at least, of the remainder of solvent mixture being organic liquid material in which waxes are freely soluble.

CARLETON ELLIS.